G. A. STANTON.
SPRING SUSPENSION FOR VEHICLES.
APPLICATION FILED JUNE 1, 1915.
1,162,414.
Patented Nov. 30, 1915.
2 SHEETS—SHEET 1.
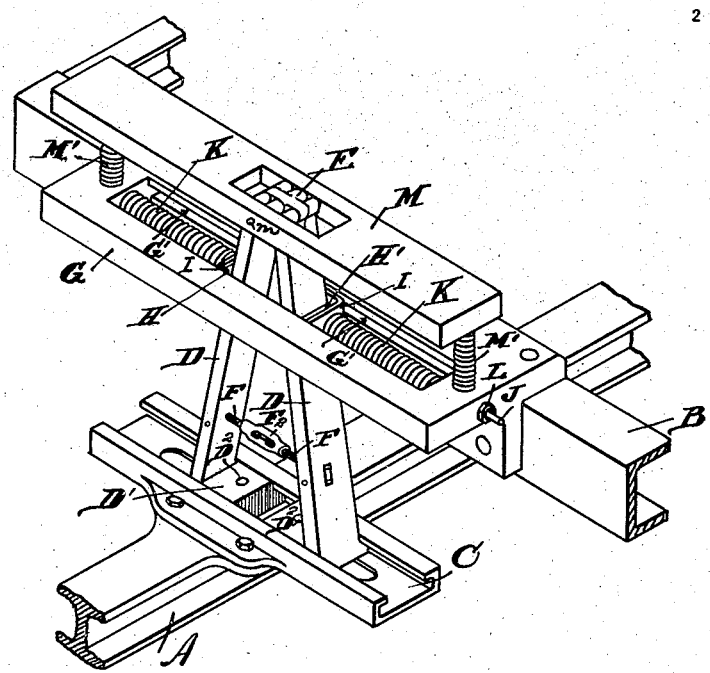
Fig. 1.
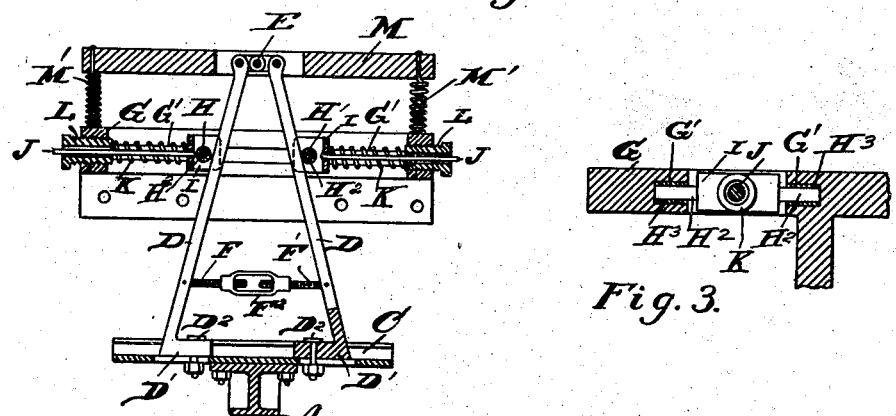
Fig. 2.
Fig. 3.
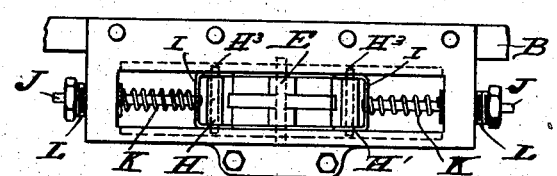
Fig. 4.
WITNESSES:
L. S. Woodhull
Grace Kyle.
INVENTOR
Gay A. Stanton
BY
J. E. Thomas
ATTORNEY

G. A. STANTON.
SPRING SUSPENSION FOR VEHICLES.
APPLICATION FILED JUNE 1, 1915.

1,162,414.

Patented Nov. 30, 1915.
2 SHEETS—SHEET 2.

UNITED STATES PATENT OFFICE.

GAY A. STANTON, OF JACKSON, MICHIGAN.

SPRING SUSPENSION FOR VEHICLES.

1,162,414. Specification of Letters Patent. Patented Nov. 30, 1915.

Application filed June 1, 1915. Serial No. 31,339.

*To all whom it may concern:*

Be it known that I, GAY A. STANTON, a citizen of the United States, residing at Jackson, county of Jackson, State of Michigan, have invented a certain new and useful Improvement in Spring Suspension for Vehicles, and declare the following to be a full, clear, and exact description of the same, such as will enable others skilled in the art to which it pertains to make and use the same, reference being had to the accompanying drawings, which form a part of this specification.

My invention relates to a spring suspension for vehicles adapted for either motor driven or horse drawn conveyances, as shown in the accompanying drawings and more particularly set forth in the following specification and claims.

One of the objects of this invention consists in providing means whereby the tension of the springs may be regulated to meet varying load conditions.

Another object is to provide means adapted to hold under check the oscillation or vibration of the vehicle when traveling over rough or rugged roads.

Another feature of the invention is the reduction in cost of installation and the ease with which a spring may be replaced in the event of one being broken.

Another feature of the invention consists in providing a plurality of wedges mounted upon the axles of a vehicle adapted to compress a plurality of sets of opposing springs suitably supported in a frame carried by the chassis of the vehicle to an extent corresponding to the degree of vibration of the chassis.

Another feature of the invention consists in providing for the adjustment of the wedges, to regulate the extent to which the springs may be compressed by the load carried.

Other advantages and improvements will hereafter appear.

Figure 5:
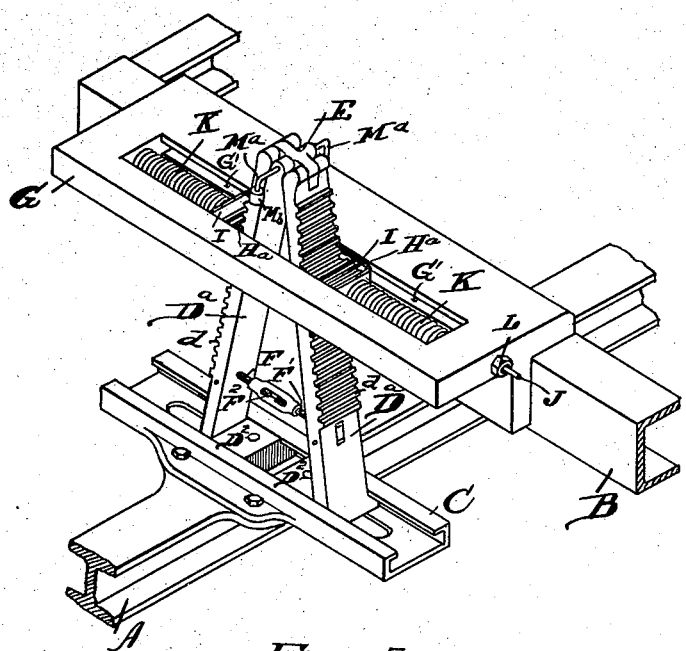
Figure 6:
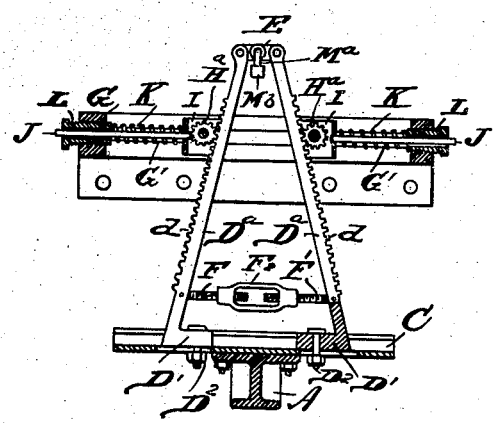

In the drawings:—Figure 1, is a fragmentary perspective view of a detail indicating a vehicle axle, an adjustable wedge supported thereon, a portion of a vehicle frame and a pair of opposing springs carried by the frame compressed by the wedge upon the vibration of the frame. Fig. 2, is a cross-sectional view through the axle of a vehicle showing the wedge mounted upon the axle and its co-acting parts in section and elevation. Fig. 3, is a cross-sectional view through the member supporting the opposing springs. Fig. 4, is a plan view of the spring supporting member mounted upon the axle and frame of a vehicle, a fragment of the axle and frame being shown. Fig. 5, is a perspective view similar to Fig. 1, of a modification of the adjustable wedge in which the latter is provided with a rack traversed by pinions forced into mesh with the racks by the respective opposing springs. Fig. 6, is a cross-sectional view through the axle of a vehicle showing the modification of the wedge indicated in Fig. 5, and the co-acting parts in section and elevation.

Referring now to the letters of reference placed upon the drawings:—A, denotes the axle of a vehicle. B, its frame or chassis.

C, is a slotted channel member bolted transversely to the axle A.

D, D, are upright members inclined toward each other at the top to form a wedge, each member being provided wth a foot piece D', slidable in the channel member C.

$D^2$, are bolts projecting from the foot pieces through the slots in the channel member C, to secure the uprights against displacement when adjusted.

E, is a casting to which the upper end of the respective members D, are hinged.

F, F', are right and left hand bolts engaged with the inclined upright members and respectively connected together by a turn buckle $F^2$, upon adjusting which, the uprights may be drawn toward each other or spaced apart.

G, is a plate bolted to the frame B, having an elongated slot through which the inclined members, D, D, forming the wedge projects.

H, and H', are rolls respectively mounted upon a relatively long shaft $H^2$, journaled in each of the U-shaped frames I, carried by bolts J, J, which extend through the end walls of the plate G. The projecting ends of the shafts $H^2$, are fitted with rolls $H^3$, and travel in opposing grooves G', formed in the plate G.

K, K, are opposing springs sleeved on the bolts J, bearing at one end upon the U-shaped members I, I, in which the rolls H, H', are journaled.

L, L, are adjustable thimbles, the ends of which bear against the springs and through which the bolts J, J, respectively project. The thimbles have a screw-threaded engagement with the end walls of the plate G, and upon adjusting the thimbles the tension of the springs may be regulated to adapt the device to the load carried.

M, is a stop-plate or abutment pivoted at m, to the member E.

M', M', are springs projecting downwardly from the stop-plate to receive the impact of the plate G, resulting from the vibration of the vehicle frame B.

In the modification shown in Fig. 5, the inclined members $D^a$, $D^a$, are provided with toothed racks $d$, $d$, traversed by pinions $H^a$, journaled in the U-shaped members I, as in the construction shown in Fig. 1. $M^a$, is a downwardly extending arm fitted with a rubber or other resilient element to limit the upward movement of the frame, as shown in Figs. 5 and 6.

Having indicated the several parts by reference letters, the construction and operation of the device will be readily understood.

Upon the front and rear axle, on each side of the vehicle, are respectively mounted the wedges formed by the adjustable inclined upright members D, D. To the chassis frame of the vehicle directly over the front and rear axle on each side of the vehicle, are bolted the slotted plates G, carrying respectively one or more pairs of opposing springs, and the anti-friction rolls H, H', journaled in the U-shaped members I, I:—forced by the springs to bear directly against the inclined faces of the wedge, as shown. In order that the device may meet varying load conditions, the inclined members forming the wedge are adapted to be adjusted by means of turn buckles $F^2$, thereby providing a wedge of greater or less angularity, the opposing springs being compressed to a greater or less extent in accordance with the load carried;—it being obvious that the farther apart the walls of the wedge are placed, the greater the resistance of the opposing springs, and vice versa.

To regulate the tension of the springs, the screw-threaded thimbles L, L, bearing against the latter may be adjusted as required. It will now be seen that the frame of the vehicle is suspended by the springs which bear against the wedge-shaped members; that the frame is kept under control through the combined action of the springs and the wedge-shaped members;—and that the degree of its oscillation is limited by contact with the spring abutments M', projecting downwardly from the stop-plate M:—or as indicated in the modification shown in Fig. 5, upon the contact of the plate G, with the rubber buffers $M^b$, carried by the downwardly projecting arms $M^a$. It will be obvious that other means may be employed to provide an adjustable wedge adapted to act upon opposing springs carried by the vehicle frame, and I therefore do not wish to limit myself to the exact construction shown in the present embodiment:—nor do I wish to confine myself to the form of "stop abutment" indicated to limit the upward movement of the frame, as it will be apparent that other means may be employed to secure this result in conjunction with my means of suspension, without departing from the scope of the invention.

While the drawings indicate only a single pair of opposing springs operating in conjunction with each wedge, it is apparent that two or more pairs of opposing springs may be employed to act upon each wedge-shaped member if desired.

Having thus described my invention what I claim is:—

1. In a device of the character described, a pair of upright members hinged together at one end, adjustable means connected with each of the upright members adapted to maintain them in spaced relation and to jointly form a wedge-shaped member, a channel plate adapted to be secured to the axle of a vehicle, means for securing the respective members of the wedge to the channel plate, a spring supporting frame adapted to be secured to the frame of a vehicle, opposing sets of springs mounted in the spring supporting frame designed to act upon opposite faces of the wedge, adjustable elements carried by the spring supporting frame adapted to be forced by the springs into contact with the inclined faces of the wedge, and means for regulating the tension of the springs.

2. In a device of the character described, a plurality of wedge members, means adapted to support the wedge members upon the axle of a vehicle, opposing sets of springs adapted to act upon the opposite faces of the wedge members, means connected with the frame of a vehicle for supporting the opposing sets of springs, and springs adapted to receive the thrust of the last named means for limiting the vibration of the vehicle frame.

3. In a device of the character described, an adjustable wedge having rack teeth upon its inclined faces, means for supporting the wedge upon the axle of a vehicle, a slotted spring supporting frame adapted to be engaged to the vehicle chassis through which the adjustable wedge projects, slidable frames supported in the annular spring supporting frame, pinions journaled in the slidable frames, opposing springs mounted in the slotted frame adapted to bear upon the slidable frames to maintain the pinions in mesh with the respective racks of the adjustable wedge, and means for regulating the tension of the springs.

4. In a device of the character described, a pair of upright members hinged together at one end and at their opposite ends provided with flanges adapted to slide in a channel member, the channel member adapted to be transversely secured to the axle of a vehicle and having openings for the passage of bolts to secure the upright members in their adjusted relation to the channel member, a pair of bolts joined by a turn buckle respectively connected with the upright members, a slotted spring supporting frame through which the wedge projects adapted for engagement with the chassis of a vehicle, movable frames slidable in the slotted frame, a rotatable element journaled in each movable frame adapted to impinge the respective upright members of the wedge, opposing springs supported in the slotted spring supporting frame adapted to force the movable frames with their rotatable element toward the respective inclined faces of the wedge, means for regulating the tension of the springs, and means for limiting the vibration of the vehicle frame.

In testimony whereof, I sign this specification in the presence of two witnesses.

GAY A. STANTON.

Witnesses:
JAMES M. ADAMS,
EDWARD HINKEL.